United States Patent

Roberts

[11] Patent Number: 5,807,638
[45] Date of Patent: Sep. 15, 1998

[54] POLYMERIC COMPOSITION FOR WATERPROOFING WALLS

[75] Inventor: Michael G. Roberts, Akron, Ohio

[73] Assignee: R.P.C., Inc., Alpharetta, Ga.

[21] Appl. No.: 641,354

[22] Filed: Apr. 30, 1997

[51] Int. Cl.⁶ ................................................. B32B 13/12
[52] U.S. Cl. ............................ 428/451; 52/515; 428/446
[58] Field of Search ...................... 428/446, 451, 428/521, 703; 525/99; 524/505; 52/309.12, 515, DIG. 7

[56] References Cited

U.S. PATENT DOCUMENTS

| | | | |
|---|---|---|---|
| 4,049,853 | 9/1977 | Tortolo | 428/70 |
| 4,316,833 | 2/1982 | McGroarty | 524/447 |
| 4,325,854 | 4/1982 | Roberts et al. | 524/476 |
| 4,332,707 | 6/1982 | Roberts et al. | 524/476 |
| 4,370,435 | 1/1983 | Roberts et al. | 524/312 |
| 4,388,349 | 6/1983 | Korpman et al. | 427/208.4 |
| 4,471,094 | 9/1984 | Uffner et al. | 525/289 |
| 4,478,912 | 10/1984 | Uffner et al. | 428/349 |
| 4,530,652 | 7/1985 | Buck et al. | 428/291 |
| 4,537,921 | 8/1985 | Uffner et al. | 524/59 |
| 4,545,699 | 10/1985 | Uffner et al. | 404/31 |
| 4,861,635 | 8/1989 | Carpenter et al. | 428/41.3 |
| 4,882,384 | 11/1989 | Willis et al. | 525/105 |
| 4,897,276 | 1/1990 | Locke et al. | 426/307 |
| 4,921,775 | 5/1990 | Richter et al. | 430/281 |
| 4,939,036 | 7/1990 | Reith | 428/349 |
| 4,956,207 | 9/1990 | Kauffman et al. | 428/34.2 |
| 5,352,531 | 10/1994 | Roberts et al. | 428/446 |
| 5,534,303 | 7/1996 | Roberts et al. | 427/385.5 |
| 5,534,583 | 7/1996 | Roberts et al. | 524/476 |

OTHER PUBLICATIONS

Letter of protest by Michael G. Roberts protesting the allowance of U.S. Appln. No. 632,130 and attachments (U.S. 5,352,531) Feb. 1993.

Wingtack Plus Tackifying Resin Specification Sheet, The Goodyear Tire & Rubber Co., Sep. 1987.

Wingtack 86, "Tech Facts", The Goodyear Tire & Rubber Co., Sep. 1987.

Wingtack Plus, "Tech Facts", The Goodyear Tire & Rubber Co., Aug. 1987.

*Primary Examiner*—D. S. Nakarani
*Attorney, Agent, or Firm*—Renner, Kenner, Greive, Bobak, Taylor & Weber

[57] ABSTRACT

Provided herein is a waterproofing composition and a method for applying the same to the surface of a wall. The waterproofing composition is polymer-based and includes an improved solvent system containing heptane. Also provided is a wall having a surface coated with the waterproofing composition of the present invention.

9 Claims, 1 Drawing Sheet

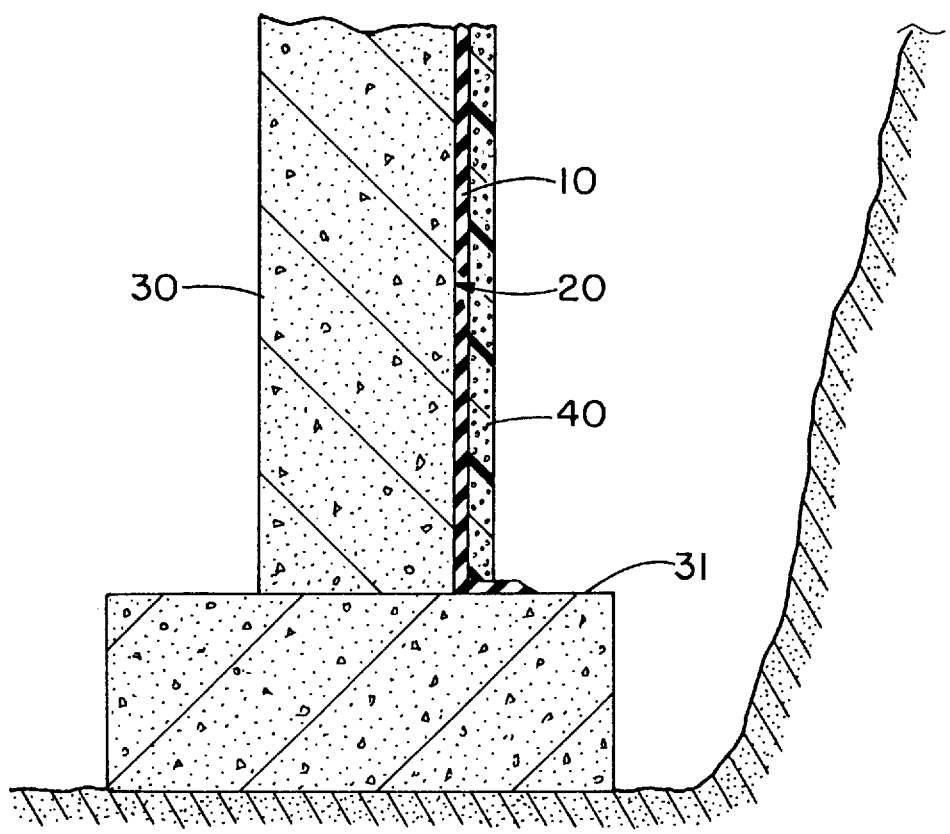

POLYMERIC COMPOSITION FOR WATERPROOFING WALLS

TECHNICAL FIELD

The present invention generally relates to a waterproofing composition and method of applying the same to a wall such as a basement wall. Particularly, the present invention relates to a waterproofing composition having an improved solvent system. Also provided is a basement wall having an exterior surface coated with an improved water impervious coating.

BACKGROUND ART

Waterproofing generally refers to a process whereby a composition is applied to a wall such as a basement wall to create a water impervious coating thereon. These compositions typically include asphalts dissolved in an organic solvent solution. Applying such compositions generally includes spraying the composition through a conventional air gun or the like and allowing the solvent to evaporate and form the water impervious coating. It is also common to apply a protective board over such coating, the board serving to protect the coating, and/or act as thermal insulation, and/or facilitate the drainage of water away from the walls. These boards typically include foamed polystyrene and fiberglass batts.

The water impervious coating should have good strength and elasticity, as well as demonstrate excellent water resistant characteristics. While these qualities have traditionally been achieved using asphalt based compositions, it has been found particularly useful to employ a polymer based composition, especially one comprising a blend of polymeric materials. This, however, requires compatibility of the polymeric materials so as to prevent separation of phases or ingredients, such separation typically resulting in the degradation of elasticity, toughness, and tack of the elastomeric coating. For purposes of this disclosure, the coatings resulting from polymeric compositions will be referred to as elastomeric coatings.

Employing a composition that is based on a combination of polymeric materials requires a proper physicochemical interaction between the polymer blend and the solvent system employed. Specifically, the solvent system must dissolve the various polymers, as well as impart numerous characteristics to the composition and coating as will be hereinafter recognized.

Of paramount importance, the solvent system must provide a sprayable solution. This typically includes the ability to provide a waterproofing composition having a viscosity less than about 5000 cps at temperatures greater than about 105° F. (40° C.), which is the temperature above which such compositions are commonly sprayed.

It is also very desirous that the solvent system impart a long shelf life to the waterproofing composition. Among the various commercial advantages of a long shelf life are the ability to store and transport the waterproofing compositions over longer periods of time. Shelf life, as will be referred to herein, represents the length of time required for the waterproofing composition will separate or destabilize. In other words, shelf life represents the duration in which the solvent system can maintain proper physicochemical interaction with the polymer blend. A short shelf life is deleterious because a separated or destabilized composition is often rendered useless and must be reprocessed.

Also of paramount importance, the solvent must provide the ability to apply a uniform and consistent coating on the wall. In fact, architectural specifications require such consistency and uniformity in the coating thickness on commercial and industrial walls, as well as some residential foundation walls. Generally, such specifications only allow a tolerance of ±20% of the nominal thickness; that is, only a deviation of ±20% of the desired thickness is permitted. It is believed that thickness uniformity is a function of the solvent system used, as the composition's ability to fill or web-out voids within the surface of the wall depends on the solvent used. Also, it is believed that the solvent employed dictates the consistency of the spray which affects the thickness of the composition, thereby affecting the thickness of the elastomeric coating. It is further believed that the solvent system employed affects the thickness uniformity because the solvent system dictates the drying rate of the composition, as well as the viscosity of the composition as the composition dries.

Not only does the solvent system affect the thickness uniformity of the elastomeric coating, but it is also believed to affect the ultimate quality of the elastomeric coating. For example, improper drying of the composition may cause the composition to skin over, resulting in blisters. Such blisters are believed to occur from the wet composition being too thick in a certain areas, typically resulting from the composition running and sagging on the wall prior to curing. These blisters cause inconsistency in the thickness of the coating and may ultimately provide a weak area where the elastomeric coating may rupture.

A solvent system for a polymer-based waterproofing composition is taught by Roberts et al. in U.S. Pat. No. 5,352,531. Roberts discloses a hydrocarbon resin and block copolymer dissolved in an organic solvent solution, the solvent containing a mixture of toluene and an aliphatic petroleum distillate. The distillate has a boiling range of about 190° F.–230° F., a flash point of about 18° F., a specific gravity of between about 0.709 to about 0.732 and an evaporation rate of about 2.2–2.6. The use of n-heptane or n-hexane is explicitly proscribed. This solution is sprayed to the exterior surface of a concrete foundation and the solvent is thereafter evaporated.

The sprayable composition of Roberts '531, however, exhibits several undesirable characteristics believed to result from the solvent system employed. Particularly, the composition does not spray or dry consistently, which is evidenced by unacceptable inconsistencies in the thickness of the wet composition upon the wall and the final coating. Also, the composition tends to run-down and sag, has a slow drying rate, poor shelf life, and creates inefficiencies such as excessive material waste due to composition run-down prior to cure. Finally, it is believed that the resulting elastomeric coating of Roberts '531 is inferior due to the solvent system employed. This inferiority is generally evidenced by the appearance of the dried coating, as well as the frequency of the blisters that occur.

Thus a need exists to develop an improved solvent solution capable of dissolving a polymer based waterproofing composition for the purpose of spraying the composition onto a wall such as a basement wall. Furthermore, a need exists to develop an improved method of applying such a waterproofing composition to a wall, thereby producing an improved elastomeric coating on the side of the wall to which the composition is applied.

DISCLOSURE OF INVENTION

It is therefore a primary object of the present invention to provide a polymer-based waterproofing composition which is sprayable and exhibits improved shelf life.

It is a further object of the present invention to provide a polymer-based waterproofing composition that when applied to a wall will, produce an improved elastomeric coating, the improvements relating to the thickness uniformity and quality of the coating.

It is another object of the present invention to provide a method of waterproofing a wall, the method employing an improved polymer-based waterproofing composition.

It is yet another object of the present to provide a waterproofed wall which is waterproofed with an improved continuous water impervious elastomeric coating disposed on the exterior surface of the wall.

At least one or more of the foregoing objects of the present invention together with the advantages thereof over existing, waterproofing compositions, methods of waterproofing, and waterproofed basement walls, which shall become apparent from the specification which follows, are accomplished by the invention hereinafter described and claimed.

In general, the present invention provides a composition of matter for waterproofing a surface of a wall including a hydrocarbon resin, a copolymer, and a solvent system including a blend of petroleum distillates and heptane, wherein the heptane includes n-heptane.

The present invention further provides a method of waterproofing at least one surface of a wall including the steps of heating a waterproofing composition, said waterproofing composition including a hydrocarbon resin, a copolymer, and a solvent system, the solvent system including a blend of petroleum distillates and heptane, wherein the heptane includes at least about 20% by weight n-heptane; applying the composition onto the surface of a wall; allowing the waterproofing composition to return to ambient temperatures; and providing sufficient time for said waterproofing composition to cure, thereby forming an water impervious elastomeric coating.

The present invention still further provides a waterproofed wall having an interior surface and an exterior surface including a continuous water impervious elastomeric coating disposed on at least one of the surfaces, the coating including a mixture of a hydrocarbon resin, and a copolymer, the coating being produced by adding a solvent system to the mixture to provide a homogeneous solution having a viscosity at about 70° F. in the range of about 30,000 cps to about 80,000, spraying the solution onto at least one surface of the wall, and thereafter evaporating the solvent system.

The present invention also provides a waterproofed wall having an interior and exterior surface including a continuous water impervious elastomeric coating disposed on at least one of the surfaces, and being introduced onto the wall by applying to at least one of the surfaces a composition of matter comprising a hydrocarbon resin, a copolymer, and a solvent system including a blend of petroleum distillates and heptane, wherein the heptane includes n-heptane, wherein the composition of matter has a viscosity at about 70° F. in the range of about 30,000 cps to about 80,000 cps.

A preferred exemplary composition, method of applying the composition, and elastomeric coating, which incorporates the concepts of the present invention, is described by way of example in the accompanying preferred embodiment and experimental description, without attempting to show all the various forms and modifications in which the invention might be embodied, the invention being measured by the appended claims and not by the details of the specification.

BRIEF DESCRIPTION OF THE DRAWING

The FIGURE is a vertical, cross-sectional partial view of a wall having an elastomeric coating thereon.

BEST MODE FOR CARRYING OUT THE INVENTION

The present invention is generally directed toward a blended polymer-based waterproofing composition. The waterproofing composition is applied to at least one surface of wall, preferably to the exterior of basement walls. The application is preferably accomplished by spraying the composition. This spraying generally occurs while the composition is heated, typically in the range between about 105° F. and about 160° F. (about 40° C. and about 71° C.), and preferably in the range between about 130° F. and about 140° F. (about 54° C. and about 60° C.). The composition is preferably sprayed using an airless spray device, such as a Graco 733 airless sprayer. Typically, an input pressure in the range between about 2500 and about 3500 psi (about 17,235 kPa and about 24,129 kPa) is employed.

The water proofing composition of the present invention is generally characterized by a viscosity, at ambient temperatures, about 70° F. (about 21° C.), in the range from about 30,000 cps to about 80,000 cps. Preferably, the viscosity of the composition, at about 70° F. (21° C.), is in the range between about 45,000 cps to about 75,000 cps. At about 130° F. (54° C.), the composition is characterized by a viscosity in the range between about 500 cps to about 1,500 cps, and preferably by a viscosity in the range between about 800 cps to about 1,200 cps. Thus, it should be evident that the viscosity of the composition is not consistent between ambient temperatures and the spraying range. Indeed, the viscosity rises sharply as the temperature of the solution falls below the temperature necessary to spray the composition.

Basement walls, as discussed herein, generally include any subsurface walls, typically including poured concrete or block walls. Desirably the application rate to poured concrete walls or parged concrete block walls will be approximately 20–30 square feet per gallon and for high density concrete block about 20–25 square feet per gallon. Once applied to the exterior wall of a basement, the composition is allowed to dry which generally refers to the evaporation of the solvent system. Once dried, the composition forms a water-impervious, elastomeric coating upon the wall, as is best depicted in the FIGURE. The coating 10 is typically about 0.03 inch to about 0.06 inch (about 30 to about 60 mils) thick and typically covers the entire exterior surface 20 of the basement wall 30 from the foundation base 31 to the expected soil level. As mentioned above, a foam protection board 40 may be applied over the elastomeric coating.

The elastomeric coatings of the present invention have an elongation (ASTM D412 Die C) of over 1800%. The coatings are flexible to minus 20° F. (tested by bending around a inch mandrel) and the abrasion resistance is less than about 0.1% membrane loss (measured using 700 psi on a 061, x0.0611 point moving across a coating membrane at the rate of about 1 inch per second). The crack bridging ability (ASTM 836) exceeds ten cycles to ⅛ inch at minus 15° F. The water vapor permeance as measured by ASTM E96 (water method) is about 0.21 perms for 40 mil dry coating grams per square foot per hour in Hg. The coatings also show excellent resistance to bacterial attack, to degradation in soil, to algae and fungus. Based on visual inspection the coatings have excellent resistance to chemicals typically found in soils and have good solvent resistance compared to asphaltic based products.

Furthermore, the elastomeric coatings of the present invention have an improved uniform thickness, believed to result from the novel solvent system employed in applying the waterproofing composition the wall. Particularly, the elastomeric coatings of the present invention have a substantially uniform thickness. It is to be understood that substantially uniform thickness refers to an elastomer coating having a maximum variance from the nominal or desired thickness which is less than about ±25%, and an average variance from the nominal thickness which is less than about ±10%. In a preferred embodiment, the uniformity is narrower than substantially uniform in that the maximum variance from nominal thickness is less than about ±20%, and the average variance from nominal thickness is less than about ±5%.

The waterproofing composition of the present invention generally comprises a blended polymer base and a solvent system. The blended polymer base, also referred to as the solids content of the composition, generally accounts for between about 40 and about 60 parts by weight of the total weight of the composition, and the solvent system generally accounts for between about 60 and about 40 parts by weight of the total composition. Preferably, the solids content accounts for between about 45 and about 55 parts by weight of the total composition. Accordingly, the solvent system preferably accounts for between about 45 and about 55 parts by weight of the total weight of the composition.

The blended polymer base of the composition of the present invention generally includes a hydrocarbon resin and a rubber or elastomeric copolymer, preferably a block copolymer. The copolymers preferably include monomeric or polymeric units which include, but are not limited to, styrene, isoprene, butadiene, or mixtures thereof. Most preferably, the block copolymers of the present invention include, but are not limited to, styrene-isoprene block copolymer, styrene-isoprene-styrene block copolymers, styrene-butadiene block copolymers, styrene-butadiene-styrene block copolymers, or mixtures thereof. Also preferred are hydrogenated block copolymers such as styrene-ethylene/butylene-styrene.

Typically, the blended polymer base includes between about 40 and about 60 percent by weight hydrocarbon resin, and preferably between about 45 and about 55 percent by weight hydrocarbon resin. Accordingly, the polymer base includes between about 60 and about 40 percent by weight block copolymers, and preferably between about 55 and about 45 percent by weight block copolymers.

The block copolymers employed in the present invention are well-known in the art and are commercially available. Generally the molecular weight of these polymers is not critical but suitably will be in the range of about 60,000 to about 180,000. The styrene content and the butadiene or isoprene content are not critical but typically the styrene content will be between about 10 and about 35 percent by weight of the copolymer, and preferably between about 15 and about 30 percent by weight of the copolymer. Preferred materials are commercially available under the trademark KRATON and are supplied by the Shell Chemical Company. For example, KRATON D1107P Thermoplastic Rubber contains at least 98% styrene-isoprene-styrene block copolymer together with negligible amounts of talc, hydrated amorphous silica and antioxidant stabilizers. Further examples include KRATON G1652 and KRATON G1652M Thermoplastic Rubbers which contain at least 98% styrene-ethylene/butylene-styrene block copolymers.

The hydrocarbon resins which are employed are also commercially available. The hydrocarbon resin may be a polyterpene resin or a petroleum hydrocarbon resin. Polyterpene resins are typically formed by polymerizing $C_{10}H_{16}$ monomers, e.g. one or more of alpha-pinene, betapinene, limonene, dipentene, betaphellandrene, myrcene, 3-carene, camphene and terpinolene. These resins are commonly sold as tackifiers.

The hydrocarbon resin can also be a petroleum resin, that is, a resin produced by the polymerization of cracked petroleum distillates. Such hydrocarbon resins can be formed by polymerizing aliphatic olefins and diolefins having four to six carbon atoms. Typically the olefins and diolefins consist primarily of monomers having five carbon atoms. Most desirably the hydrocarbon resin will be provided with some aromaticity. The aromaticity can be provided by polymerizing the monomers in the presence of styrene or an alpha-methyl styrene. Less suitably, the styrene and alpha-methyl styrene can be separately polymerized and blended in with the $C_4$–$C_6$ polymerized resin. These hydrocarbon resins are solid at room temperature. Exemplary formulations can be found in U.S. Pat. No. 3,577,398. Representative of the monomers which are typically included are isoamylene (2,2 dimethyl-1 propene), piperylene (1,3 pentadiene), isoprene (2-methyl-1,3 butadiene), 2-methyl-1 butene and 2 methyl-2 butene. Typically the hydrocarbon resins have softening points in excess of about 140° F. or 158° F. (60° or 70° C.) and usually in the range of about 140° F. (60° C.) to about 356° F. (180° C.). Most desirably they have softening points in the range from about 176° F. (80° C.) to about 230° F. (110° C.).

Commercially available hydrocarbon resins suitable for use in the present invention are those tackifiers supplied under the trade designation WINGTACK and specifically WINGTACK "PLUS" "115" "86" and "95". Others include the resins supplied commercially under the designation NEVTAC such as, for example, NEVTAC 100 and SUPER NEVTAC 99. It is, however, particularly preferred to employ the PICCOPALE 100 hydrocarbon resin which is available from Hercules Incorporated.

The waterproofing composition of the present invention further includes a solvent system. The solvent system includes a blend of petroleum distillates, preferably naphthenic distillates, and heptane. The solvent system includes from about 45 to about 70 percent by weight petroleum distillate and from about 30 to about 55 percent by weight heptane. Preferably, the solvent system includes from about 50 to about 65 percent by weight petroleum distillate and from about 35 to about 50 percent by weight heptane. The heptane employed must contain n-heptane in the range from about 20 to about 30 percent by weight. Preferably, the heptane will contain 25 percent n-heptane. Preferred among the naphthenic distillates is that sold under the name Lactol Spirits by UNOCAL. The preferred Lactol Spirits are generally characterized as set forth in TABLE I.

TABLE I

| TEST DESCRIPTION | TEST VALUE | ASTM TEST |
| --- | --- | --- |
| API Gravity (60/60 F) | 58.2 | D-287 |
| Distillation, IBP | 203° F. | D-86 |
| Distillation 10% | 205° F. | D-86 |
| Distillation 30% | 206° F. | D-86 |
| Distillation 50% | 207° F. | D-86 |
| Distillation 70° | 208° F. | D-86 |
| Distillation 90% | 212° F. | D-86 |
| Distillation DP | 220° F. | D-86 |
| Specific Gravity (60/60 F) | 0.745 | D-1298 |

TABLE I-continued

| TEST DESCRIPTION | TEST VALUE | ASTM TEST |
|---|---|---|
| Kauri-Butanol Value (XB) | 41.1 | D-1133 |
| Aniline Point | 113.2° F. | D-611 |
| Flash Point (TCC) | 17° F. | D-96 |
| Color, Saybolt | 30 | D-156 |
| Doctor Test | −1.000 | D-235 |
| Corrosion (3 hrs @ 122° F.) | 1.000 | D-130 |
| Aromatic Content | 11.75% (volume) | GC |
| Benzene Content | 0.010% (weight) | D-2600 |
| Toluene | 11.74% (volume) | GC |
| CB Aromatics | 0.001% | GC |
| Water Content | 72 ppm | D-1364 |

Further, naphthenic processing oils may be added to the solvent system. These materials are commercially available, for example, from the Shell Chemical Company under the tradename SHELLFLEX 371, which is a heavy naphthenic distillate solvent that has been refined, hydrotreated, and acid treated. Also available is that sold by Crowley Chemical Company under the trademark VIPLEX, which is a light naphthenic hydrotreated distillate. When employed, the processing oil may be present in an amount up to about 7 percent by weight, based on the amount of block co-polymer and hydrocarbon resin employed.

EXPERIMENTAL

In order to demonstrate the practice of the present invention, six (6) waterproofing compositions were prepared, three (3) according to the specifications of the present invention, and three (3) according to the prior art, namely Roberts '531. Each composition was applied to a separate and distinct commercial foundation, referred to as Buildings A–F. Three (3) wet film measurements were taken on each of four (4) walls of each building. The recipes of the six (6) compositions are shown in TABLE II, and the results of the wet film measurements are shown in TABLE III.

The compositions sprayed on Buildings A, B, and C represent those coatings taught by the prior art, and the compositions sprayed on Buildings D, E, and F represent compositions according the present invention.

TABLE II

Waterproofing Composition Constituent Concentration (Percent by weight)

| | BUILDING | | | | | |
|---|---|---|---|---|---|---|
| Constituent | A | B | C | D | E | F |
| Kraton D 1107 P | 22 | 23.5 | 22 | 22 | 23.5 | 22 |
| Piccopale 100 | 25 | 23.5 | 25 | 25 | 23.5 | 25 |
| Pigment (green) | 1 | 1 | 1 | 1 | 1 | 1 |
| Lacolene | 43 | 43 | 41 | — | — | — |
| Toluene | 7 | 7 | 9 | — | — | — |
| Lactol | — | — | — | 20 | 20 | 23.5 |
| Heptane | — | — | — | 30 | 30 | 27.5 |
| Shellflex 371 | 2 | 2 | 2 | 2 | 2 | 2 |

Each wall was sprayed using an airless sprayer equipped with a 731 spray tip. All compositions were sprayed at 140° F. (60° C.) with 3000 psi (20,682 kPa) of input pressure. The environmental conditions were also consistent for each application, generally sunny, low wind, with temperatures in the range between 65° F. and 75° F. (18° C.–24° C.).

Film thickness, that is, the thickness of the wet composition upon the wall, were measured using a wet thickness gauge, which gives readings in two thousandths of an inch (2 mils). It should be appreciated that the solids content of the composition of the present invention, as well as that of the prior art., is approximately 45–55%, and therefore, the thickness of the elastomeric coating resulting therefrom is approximately one half (½) that of the wet composition upon the wall. The three film thickness readings taken from each wall were taken within a four (4) ft. by four (4) ft. area. The specification of each building called for a wet thickness of 60 mils, and therefore the percent (%) variance was calculated based on deviance from 60 mils.

TABLE III

Wet Film Thickness
Specification of 60 Wet Mils

| | | Building A | | Building B | | Building C | | Building D | | Building E | | Building F | |
|---|---|---|---|---|---|---|---|---|---|---|---|---|---|
| WALL | Reading | Mils | % Var | Mils | % Var | Mils | % Var | Mils | % Var | Mils | % Var | Mils | % Var |
| I | 1 | 76 | 27 | 52 | 13 | 76 | 27 | 62 | 3 | 62 | 3 | 60 | 0 |
|   | 2 | 62 | 3 | 72 | 20 | 46 | 23 | 66 | 10 | 64 | 7 | 48 | 20 |
|   | 3 | 72 | 20 | 72 | 20 | 62 | 3 | 58 | 3 | 66 | 10 | 62 | 3 |
| II | 1 | 62 | 3 | 32 | 47 | 70 | 17 | 70 | 17 | 56 | 7 | 60 | 0 |
|   | 2 | 56 | 7 | 48 | 20 | 68 | 13 | 58 | 3 | 60 | 0 | 58 | 3 |
|   | 3 | 74 | 23 | 62 | 3 | 82 | 37 | 66 | 10 | 66 | 10 | 64 | 7 |
| III | 1 | 50 | 17 | 66 | 10 | 68 | 13 | 64 | 7 | 70 | 17 | 62 | 3 |
|   | 2 | 48 | 20 | 64 | 7 | 58 | 3 | 64 | 7 | 66 | 10 | 68 | 13 |
|   | 3 | 68 | 13 | 58 | 13 | 52 | 13 | 60 | 0 | 62 | 3 | 60 | 0 |
| IV | 1 | 60 | 0 | 72 | 20 | 56 | 7 | 54 | 10 | 58 | 3 | 64 | 7 |
|   | 2 | 58 | 3 | 62 | 3 | 36 | 40 | 58 | 3 | 56 | 7 | 56 | 7 |
|   | 3 | 74 | 23 | 80 | 33 | 38 | 37 | 66 | 10 | 60 | 0 | 60 | 0 |

Regarding the wet thickness readings resulting from the composition of the prior art used on Buildings A, B, and C, the maximum variance for each building was 27%, 47%, and 37%, respectively; and the average variance for each building was 13%, 17%, and 17%, respectively. With regard to the wet thickness readings resulting from the composition of the present invention used on Buildings D, E. Hand F, the maximum variance for each building was 17%, 17%, and 20%, respectively; and the average variance for each building was 7%, 6%, and 5%, respectively. Thus, the average variance for the composition of the prior art was 15%, while the average variance for the present invention was 6%.

As should be clearly evident, the improved solvent system of the present invention provided for a wet thickness, and therefore an elastomeric coating, that has improved uniformity of thickness. Indeed, all readings were within ±20% variance of 60 mils, while ten (10) readings using the solvent system of the prior art were outside of the ±20% variance. Moreover, the average variance of the present invention is only 40% as great as that of the prior art.

Additionally, the waterproofing composition of the present invention and that of the prior art, Roberts '531, were subjected to a stability test. The compositions were substantially identical to those described in TABLE II; that is, the compositions representing the present invention were substantially identical to the compositions applied to Buildings D, E, and F, and the compositions representing the prior art were substantially identical to the compositions applied to Buildings A, B, and C.

The stability test was performed as follows. Four (4) samples of each composition, that of the present invention and the prior art, were placed in sealed pint cans. These cans were placed in an oven and maintained at a constant temperature of 95° F. (35° C.) for a period of thirty (30) days. The cans were removed from the oven and cooled to ambient temperature. The lids were then removed without disturbing the contents. The depth of the colorless liquid on the top of each sample was measured and is reported in TABLE IV.

TABLE IV

| | Accelerated Stability Test Separation (mm) | | | |
|---|---|---|---|---|
| | SAMPLE NO. | | | |
| | 1 | 2 | 3 | 4 |
| Prior Art | 30 | 17 | 43 | 12 |
| Present Invention | <1* | <1* | <1* | <1* |

*separation was negligible an not measurable

The depth of the colorless liquid, which is believed to primarily comprise the solvent system, is directly related to the degree of separation or destabilization of the composition. In turn, the degree of separation or destabilization is directly related to the shelf life of the product. The shelf life of polymeric based compositions is critical because separation can often only be cured by the reprocessing of the composition.

The above results clearly demonstrate that the composition of the present invention has far greater stability than the composition of the prior art. Thus, the composition of the present invention is expected to have a shelf life far greater than that of the prior art. It is believed that the separation observed with the compositions of the prior art is responsible for the unacceptable shelf life often experienced with that composition.

Further, it should be noted that the composition of the present invention demonstrates many other improved characteristics not quantified herein. For example, the composition exhibits an improved dry rate, believed to result from the unexpected and surprisingly high viscosity of the solution at ambient temperatures. Also, the composition of the present invention demonstrates decreased sag and run-down, which minimizes blistering and material waste, the material waste resulting from the composition running down the wall prior to curing. Moreover, the elastomeric coating of the present invention provides an excellent appearance, as well an excellent seal resulting from the reduced sag, run-down and blistering of the composition.

The many benefits of the present invention as described above can also be obtained by including other ingredients in the formulation provided, of course, that those ingredients, either qualitatively or quantitatively, do not materially change the basic and novel characteristics of the present inventive formulations. Such adjuvants, although not needed for coating basement walls, may include stabilizers, antioxidants and pigments or colorants in amounts suitable to achieve their purpose.

Based upon the foregoing disclosure, it should now be apparent that the composition, method of applying the composition, and article resulting from the application of the composition as described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A waterproofed wall having an interior surface and an exterior surface comprising:
a continuous, spray coated, water impervious elastomeric coating disposed on at least one of the surfaces, said coating having a maximum variance form its nominal thickness of less than about ±25 percent and an average variance from its nominal thickness of less than about ±10 percent, said coating comprising a mixture of:
a hydrocarbon resin, and
a rubber having units selected from the groups consisting of styrene, isoprene, butadiene and mixtures thereof, said coating being produced by adding a solvent system to said mixture, said solvent system comprising a blend of a petroleum distillates and heptane, said heptane including n-heptane, and said solvent system providing a homogeneous solution having a viscosity at about 70° F. in the range of about 30,000 cps to about 80,000 cps and a viscosity at about 130° F. in the range of about 500 cps to about 1500 cps, spraying said solution onto at least one surface of the wall, and thereafter evaporating the solvent system.

2. A waterproofed wall, as in claim 1, wherein said heptane comprises about 20 to about 30 percent by weight n-heptane.

3. A waterproofed wall, as in claim 1, wherein said mixture further comprises a processing oil.

4. A waterproofed wall, as in claim 1, wherein said rubber is selected from the group consisting of styrene-isoprene block copolymers, styrene-isoprene-styrene block copolymers, styrene-butadiene block copolymers, styrene-butadiene-styrene block copolymers, styrene-ethylene/butylene-styrene block copolymers, and mixtures thereof.

5. A wall that has been waterproofed with a waterproofing composition comprising:
from about 40 to about 60 parts by weight of a blended polymer base, said blended polymer base including:
from about 40 to about 60 percent by weight of a hydrocarbon resin, and
from about 40 to about 60 percent by weight of a rubber having units selected from the group consisting of styrene, isoprene, butadiene and mixtures thereof; and
from about 40 to about 60 parts by weight of a solvent system, said solvent system including:
from about 45 to about 70 percent by weight a petroleum distillate, and from about 30 to about 55 percent by weight of heptane, said heptane including n-heptane, wherein the composition forms a continuous, spray coated, water impervious elastomeric coating having a maximum variance from its nominal thickness of less than about ±25 percent and an average variance from its nominal thickness of less than about ±10 percent.

6. A wall that has been waterproofed, as in claim 5, wherein said heptane comprises at least about 20 percent by weight n-heptane.

7. A wall that has been waterproofed, as in claim 5, wherein said waterproofing composition has a viscosity at about 70° F., in the range from about 30,000 cps to about 80,000 cps, and a viscosity at about 130° F., in the range from about 500 cps to about 1500 cps.

8. A wall that has been waterproofed, as in claim 5, wherein said blended polymer base further includes up to about 7 percent by weight of a processing oil.

9. A wall that has been waterproofed, as in claim 5, wherein said rubber is selected from the group consisting of styrene-isoprene block copolymers, styrene-isoprene-styrene block copolymers, styrene-butadiene block copolymers, styrene-butadiene-styrene block copolymers styrene-ethylene/butylene-styrene block copolymers, and mixtures thereof.

* * * * *